July 10, 1923.
A. J. KARL ET AL
COMBINED WINCH AND SUPPORT THEREFOR
Filed July 5, 1922
1,461,637
3 Sheets-Sheet 1
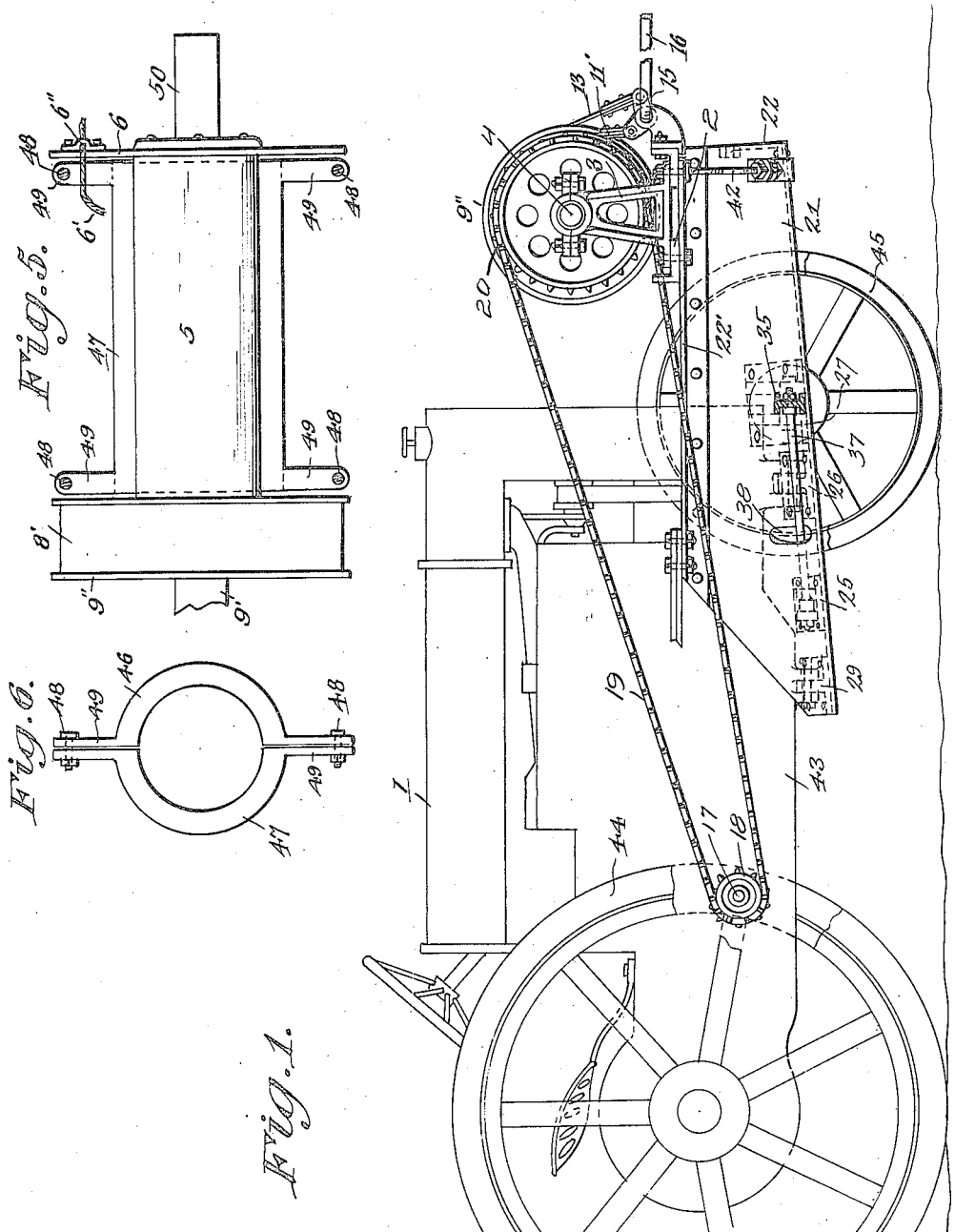
Benjamin F. Webb
Andrew J. Karl,
INVENTORS
BY
Geo. P. Kimmel
ATTORNEY.

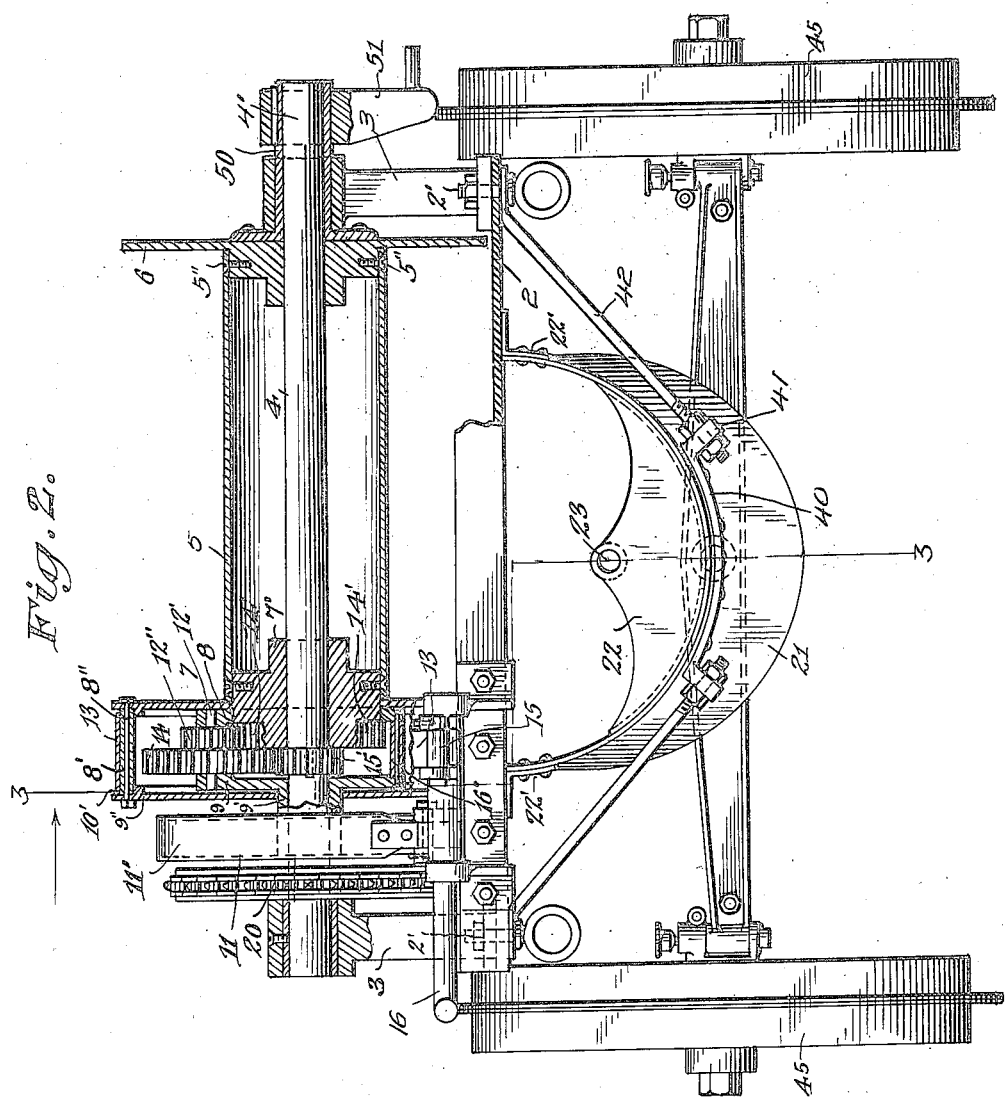

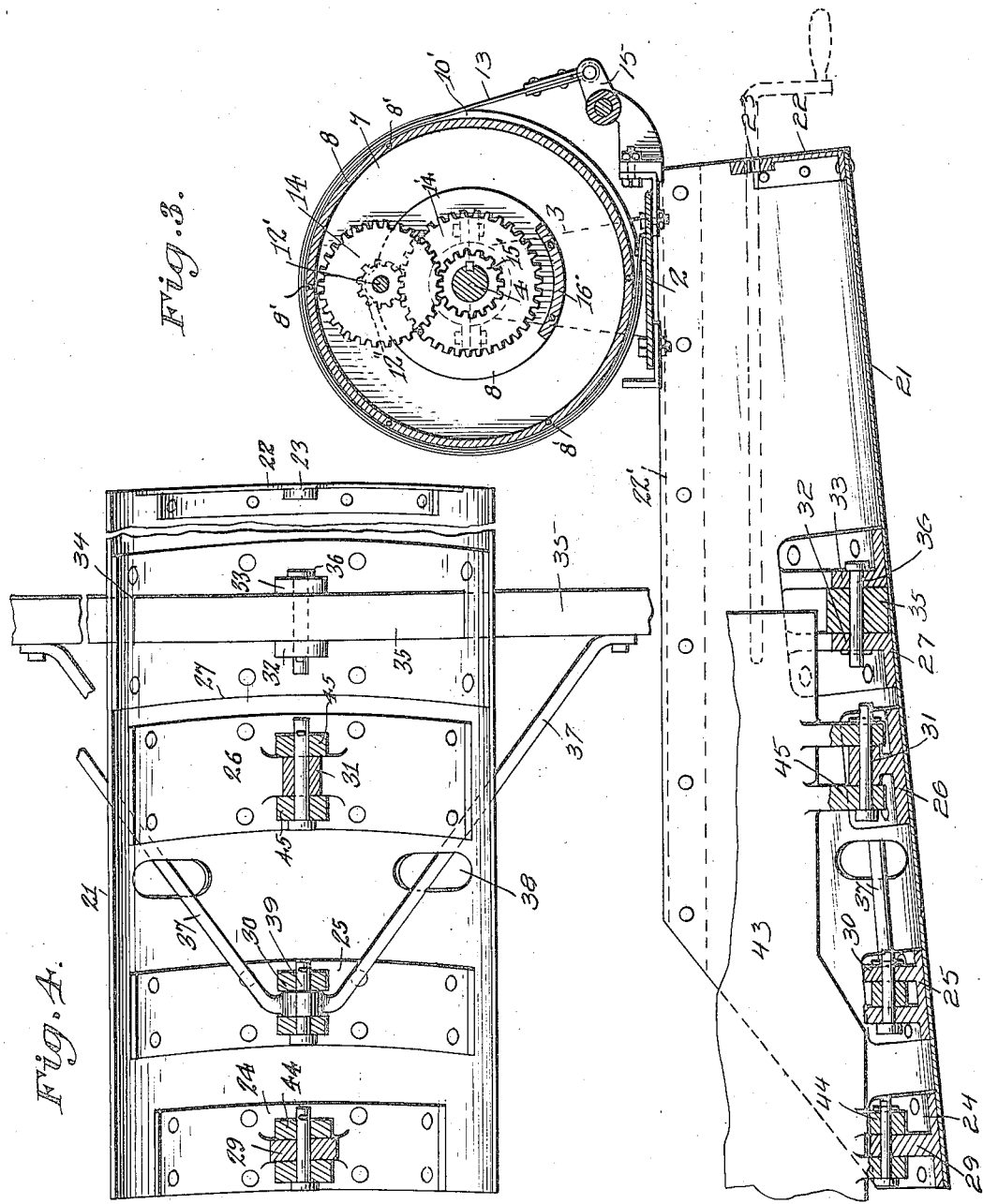

Patented July 10, 1923.

1,461,637

UNITED STATES PATENT OFFICE.

ANDREW J. KARL, OF SISTERSVILLE, AND BENJAMIN F. WEBB, OF BENS RUN, WEST VIRGINIA, ASSIGNORS TO WEBB MULTISPEED WINCH MANUFACTURING COMPANY, OF SISTERSVILLE, WEST VIRGINIA, A CORPORATION OF WEST VIRGINIA.

COMBINED WINCH AND SUPPORT THEREFOR.

Application filed July 5, 1922. Serial No. 572,810.

*To all whom it may concern:*

Be it known that we, ANDREW J. KARL and BENJAMIN F. WEBB, citizens of the United States, residing at Sistersville and Bens Run, respectively, in the county of Tyler and State of West Virginia, have invented certain new and useful Improvements in Combined Winches and Supports Therefor, of which the following is a specification.

This invention relates to a combined winch and tractor extension and has for its object to provide a machine of such class, in a manner as hereinafter set forth, with means whereby the machine can be positioned at any desired point with respect to the object operated upon and furthermore whereby the driving of the winch and drum element can be had from the motor of the tractor and with the drum element under control of the winch so that said element is driven at less speed than the speed of the driving shaft of the winch, or in other words provide a hoisting, pulling and winding mechanism mounted on a tractor and operated from the motor of the latter and including means for controlling the speed of the drum of said mechanism with respect to the speed of the motor.

A further object of the invention is to provide a combined winch and tractor extension having a drum element, provided with removable means in order that the speed could be increased in winding more line without changing the size of any of the gears of the winch element.

Further objects of the invention are to provide a machine for the purpose set forth which is comparatively simple in its construction and arrangement, strong, durable, portable, efficient and convenient in its use, readily assembled and comparatively inexpensive.

With the foregoing and other objects in view, the invention consists of a novel construction, combination and arrangement of parts as hereinafter more specifically described, and illustrated in the accompanying drawings, wherein is shown an embodiment of the invention, but it is to be understood that changes, variations and modifications, can be resorted to which come within the scope of the claims hereunto appended.

In the drawings wherein like reference characters denote corresponding parts throughout the several views:—

Figure 1 is a side elevation of a combined winch and tractor extension in accordance with this invention, Fig. 2 is a front elevation, partly in section, Fig. 3 is a section on the line 3—3 of Figure 2, Fig. 4 is a detail, Fig. 5 is a front view showing a drum attachment for the drum element, Fig. 6 is an end view of the drum attachment.

Referring to the drawings in detail, 1 denotes a tractor having rear wheels 44 and front wheels 45, these latter being extended laterally with respect to the tractor so as to balance the latter, as it has an inclination to raise off the ground when pulling a heavy load. Projecting forwardly thereof is a support 2, provided with a pair of spaced standards 3, in which is journaled a driven shaft 4. The latter projects outwardly from one of the standards 3, as at 4', for a purpose to be presently described.

Mounted on the shaft 4 is a hoisting or winding drum or winch, which includes a drum element consisting of a pair of circular end plates, 6, 7, each provided with an inwardly extending hub 7' loosely mounted on the shaft 4. Mounted on the hubs 7' is a cylindrical member 5, fixedly secured in position on said hubs, by the holdfast devices 5'', and upon the member 5 is wound or unwound the hoisting or pulling cable 6', which has one end secured, as at 6'' to the plate 6. Associated with the drum element is a gear drive mechanism therefor, which is operatively connected to the shaft 4, and to the drum element, and which consists of a pair of gear plates 8, 9, the former is mounted on a hub 7' and the latter is provided with a sleeve 9' which is mounted on the shaft 4 and extends outwardly through the outer side plate 9'', of the casing of the said mechanism, and such casing is formed with an annular rim 8' arranged between the side plate 9'' and plate 7, and which are secured together by the connecting devices 8''. The rim 8' is arranged inwardly with respect to the edges of the plates 7 and 9'', forming what may be a circumferential groove 10' for a brake band 13. The gear plates 8, 9, oppose each other and support a shaft 12', which carries a pinion 12" and a gear wheel 14. Keyed to the drive shaft 4 is a pinion 15' which meshes with the gear wheel 14, and formed on the hub 7' which supports the plate 8, is a gear wheel 14' which meshes with the pinion 12", and is confined on the shaft 4 between the pinion 15' and gear plate 8. Mounted on the sleeve 9' is a brake wheel 11 having a brake band 11'. An actuating device for simultaneously operating the brake bands 11' and 13 is indicated at 15 and includes a lever or handle member 16. A balance 16' for the gear 14, is carried by the plates 8, 9.

Operated from the motor of the tractor 1, is a shaft 17 having a sprocket pinion 18, which is connected by a sprocket chain 19, to a sprocket wheel 20 mounted on the shaft 4, and by this arrangement the shaft 4 is driven from the engine or motor of the tractor when desired.

Mounted below the support 2, and extending rearwardly therefrom, is a downwardly inclined tractor extension consisting of an elongated semi-circular member 21 having a head plate 22, at the forward end thereof, and which is provided with a guide opening 23 for the passage of a crank element for the motor of the tractor.

Reinforcing plates 24, 25, 26, and 27 are mounted within and secured to the member 21 at the bottom thereof. The plate 24 has a web 29, plate 25 a pair of webs 30, plate 26 a web 31, plate 27 a web 32 and 33. The member 21, as well as the plate 27 is provided with openings 34 for the passage of the front axle 35 of the tractor. The axle 35 passes between the webs 32, 33 and is secured thereto by the hold-fast device 36. Secured to the axle 35 and extending rearwardly therefrom, is a V-shaped brace member 37 which passes through openings 38 in the member 21 and is anchored to the webs 30 at 39. Secured to the lower face of the member 31 at the forward end thereof, is a reinforcing member 40, having angle shaped ends 41, to which are secured brace members 42, which associate with and are connected to the ends of the supports 2, as at 2'.

Arranged within the member 21, at the rear thereof, is an auxiliary support 43 which is anchored as at 44 to the web 29, and at 45 to the web 31.

Extending rearwardly from the supports 2, which are angle-shaped and oppositely disposed with respect to each other, are angle-shaped members 22', which are secured to the top of the curved member 21.

The winch includes a removable attachment for the purpose of increasing speed in winding more line or cable without changing the size of any of the gears of the winch, and which consists of a pair of semi-circular flanged members 46, 47, adapted to be mounted on the drum cylinder 5, and secured in position by the hold-fast devices 48, extended through the flanges 49 of said members 46, 47, and which increases the diameter of the drum element of the winch.

To provide for the operation of the winch, when the shaft 4 is not driven from the motor of the tractor, the plate 6 has secured thereto a sleeve 50, which is mounted on the extended end 4' of the shaft 4, and is adapted to have detachably secured therewith, a crank 51, whereby the winch can be operated and at less speed than that attained through the shaft 4.

The drive gear mechanism of the winch is adapted to operate the drum element at less speed than the speed of the drive shaft which is driven from the motor of the tractor.

What we claim, is:—

1. In combination a support, a pair of standards carried thereby, a driven shaft mounted on the standards and extending outwardly from one of them, a driving element for said shaft positioned thereon near the other end thereof, a pinion fixed to the shaft, a revolvable drum including a pair of hubs loosely mounted on the shaft and further including a gear formed on one of the hubs and an inclosing means for the gear, one of said hubs extending on the extended end of said shaft, means connected with said extended hub for manually operating the drum, drum actuating elements driven from said pinion and meshing with said gear and arranged in said inclosing means, and revolvable supports for said elements, said supports connected together and loosely mounted on one of said hubs and said shaft.

2. In combination a support, a pair of standards carried thereby, a driven shaft mounted on the standards and extending outwardly from one of them, a driving element for said shaft positioned thereon near the other end thereof, a pinion fixed to the shaft, a revolvable drum including a pair of hubs loosely mounted on the shaft and further including a gear formed on one of the hubs and an inclosing means for the gear, one of said hubs extending on the extended end of said shaft, means connected with said extended hub for manually operating the drum, drum actuating elements driven from said pinion and meshing with said gear and arranged in said inclosing means, revolvable supports for said elements, said supports connected together and loosely mounted on one of said hubs and said shaft, and a brake element for said drum cooperating with said inclosing means.

3. In combination a support, a pair of standards carried thereby, a driven shaft mounted on the standards and extending outwardly from one of them, a driving element for said shaft positioned thereon near the other end thereof, a pinion fixed to the shaft, a revolvable drum including a pair of hubs loosely mounted on the shaft and further including a gear formed on one of the hubs and an inclosing means for the gear, one of said hubs extending on the extended end of said shaft, means connected with said extended hub for manually operating the drum, drum actuating elements driven from said pinion and meshing with said gear and arranged in said inclosing means, revolvable supports for said elements, said supports connected together and loosely mounted on one of said hubs and said shaft, a brake element for said drum cooperating with said inclosing means, and a brake element for said actuating elements cooperating with one of said supports.

4. In combination a support, a pair of standards carried thereby, a driven shaft mounted on the standards and extending outwardly from one of them, a driving element for said shaft positioned thereon near the other end thereof, a pinion fixed to the shaft, a revolvable drum including a pair of hubs loosely mounted on the shaft and further including a gear formed on one of the hubs and an inclosing means for the gear, one of said hubs extending on the extended end of said shaft, means connected with said extended hub for manually operating the drum, drum actuating elements driven from said pinion and meshing with said gear and arranged in said inclosing means, revolvable supports for said elements, said supports connected together and loosely mounted on one of said hubs and said shaft, one of said supports provided with a hub extended from said inclosing means, and a brake element cooperating with said hub of said support.

5. In combination a support, a pair of standards carried thereby, a driven shaft mounted on the standards and extending outwardly from one of them, a driving element for said shaft positioned thereon near the other end thereof, a pinion fixed to the shaft, a revolvable drum including a pair of hubs loosely mounted on the shaft and further including a gear formed on one of the hubs and an inclosing means for the gear, one of said hubs extending on the extended end of said shaft, means connected with said extended hub for manually operating the drum, drum actuating elements driven from said pinion and meshing with said gear and arranged in said inclosing means, revolvable supports for said elements, said supports connected together and loosely mounted on one of said hubs and said shaft, one of said supports provided with a hub extended from said inclosing means, a brake element cooperating with said hub of said support, and a braking element for said drum cooperating with said inclosing means.

6. In combination a support, a pair of standards carried thereby, a driven shaft mounted in said standards, a driving element for said shaft fixed thereto, a pinion fixed to said shaft, a revolvable drum including a pair of hubs loosely mounted on said shaft and further including a gear formed on one of said hubs and an inclosing means for said gear, drum actuating elements driven from said pinion and meshing with said gear and arranged in said inclosing means, and supports for said actuating elements, said supports arranged in said means, connected together and one of said supports provided with a hub extended from said means, a braking element cooperating with said hub of said support, and a brake element cooperating with said inclosing means.

7. In combination a support, a pair of standards carried thereby, a driven shaft mounted in said standards, a driving element for said shaft fixed thereto, a pinion fixed to said shaft, a revolvable drum including a pair of hubs loosely mounted on said shaft and further including a gear formed on one of said hubs and an inclosing means for said gear, drum actuating elements driven from said pinion and meshing with said gear and arranged in said inclosing means, and supports for said actuating elements, said supports arranged in said means, connected together and one of said supports provided with a hub extended from said means, a braking element cooperating with said hub of said support, a brake element cooperating with said inclosing means, operating means for each of said brake elements, and an actuating lever common to said operating means.

In testimony whereof, we affix our signatures hereto.

BENJAMIN F. WEBB.
ANDREW J. KARL.